(12) United States Patent
Munson et al.

(10) Patent No.: US 6,312,598 B1
(45) Date of Patent: Nov. 6, 2001

(54) FILTERS INCLUDING FILTER ENVELOPES FORMED FROM PANELS HAVING DIFFERENT PERMEABILITIES

(76) Inventors: James R. Munson, 804 Devon La., Neshanic Station, NJ (US) 08853; Paul Roberts, 3912 Caney Rd., Henryville, IN (US) 47126

(*) Notice: Subject to any disclaimer, the term of this patent is extended or adjusted under 35 U.S.C. 154(b) by 0 days.

(21) Appl. No.: 09/495,095

(22) Filed: Feb. 1, 2000

Related U.S. Application Data

(63) Continuation of application No. 09/028,223, filed on Feb. 23, 1998.

(51) Int. Cl.$^7$ .................................................. B01D 27/04
(52) U.S. Cl. ..................... 210/317; 210/323.1; 210/461; 210/486; 210/501; 210/502.1; 210/504; 210/506; 210/508; 210/509; 210/DIG. 8
(58) Field of Search ............................... 210/DIG. 8, 317, 210/323.1, 416.1, 435, 445, 453, 455, 459, 461, 486, 501, 502.1, 503, 504, 506, 508, 509, 500.26

(56) References Cited

U.S. PATENT DOCUMENTS

| | | | |
|---|---|---|---|
| 2,551,312 | * | 5/1951 | Bokich . |
| 3,662,887 | * | 5/1972 | Unlhorn, Jr. . |
| 3,735,871 | * | 5/1973 | Bisko . |
| 4,113,623 | * | 9/1978 | Koether et al. . |
| 4,250,039 | * | 2/1981 | Cozzi et al. . |
| 4,282,094 | * | 8/1981 | Mitchell . |
| 4,549,963 | * | 10/1985 | Jensen et al. . |
| 4,623,544 | * | 11/1986 | Highnote . |
| 4,783,260 | * | 11/1988 | Kurihara . |
| 4,805,525 | * | 2/1989 | Bivens . |
| 4,959,144 | * | 9/1990 | Bernard et al. . |
| 4,988,440 | * | 1/1991 | Bernard et al. . |
| 5,019,254 | * | 5/1991 | Abrevaya . |
| 5,053,125 | * | 10/1991 | Willinger et al. . |
| 5,057,217 | * | 10/1991 | Lutz et al. . |
| 5,075,000 | * | 12/1991 | Bernard et al. . |
| 5,143,604 | * | 9/1992 | Bernard et al. . |
| 5,229,013 | * | 7/1993 | Regutti . |
| 5,253,566 | * | 10/1993 | McCabe et al. . |
| 5,404,799 | * | 4/1995 | Bivens . |
| 5,458,772 | * | 10/1995 | Eskes et al. . |
| 5,595,107 | * | 1/1997 | Bivens . |
| 5,597,600 | * | 1/1997 | Munson et al. . |
| 5,665,238 | * | 9/1997 | Whitson et al. . |
| 5,709,899 | * | 1/1998 | Bivens . |
| 5,731,024 | * | 3/1998 | Bivens . |

* cited by examiner

*Primary Examiner*—W. L. Walker
*Assistant Examiner*—David Sorkin

(57) ABSTRACT

A filter for removing undesired materials from a fluid, such as used cooking oil, for example, includes a filter envelope including first and second panels. The first panel has a permeability which is greater than that of the second panel. The first panel of the filter envelope may be formed from a filter pad and the second panel from a filter paper, and may enclose a metal spacer grid. When the filter is connected to a pump for drawing the oil through the filter, the flow of the oil is directed selectively through the filter pad, whereby undesired materials are removed from the oil. The filter provides for efficient flow of the oil to be filtered while removing undesired materials therefrom.

10 Claims, 2 Drawing Sheets

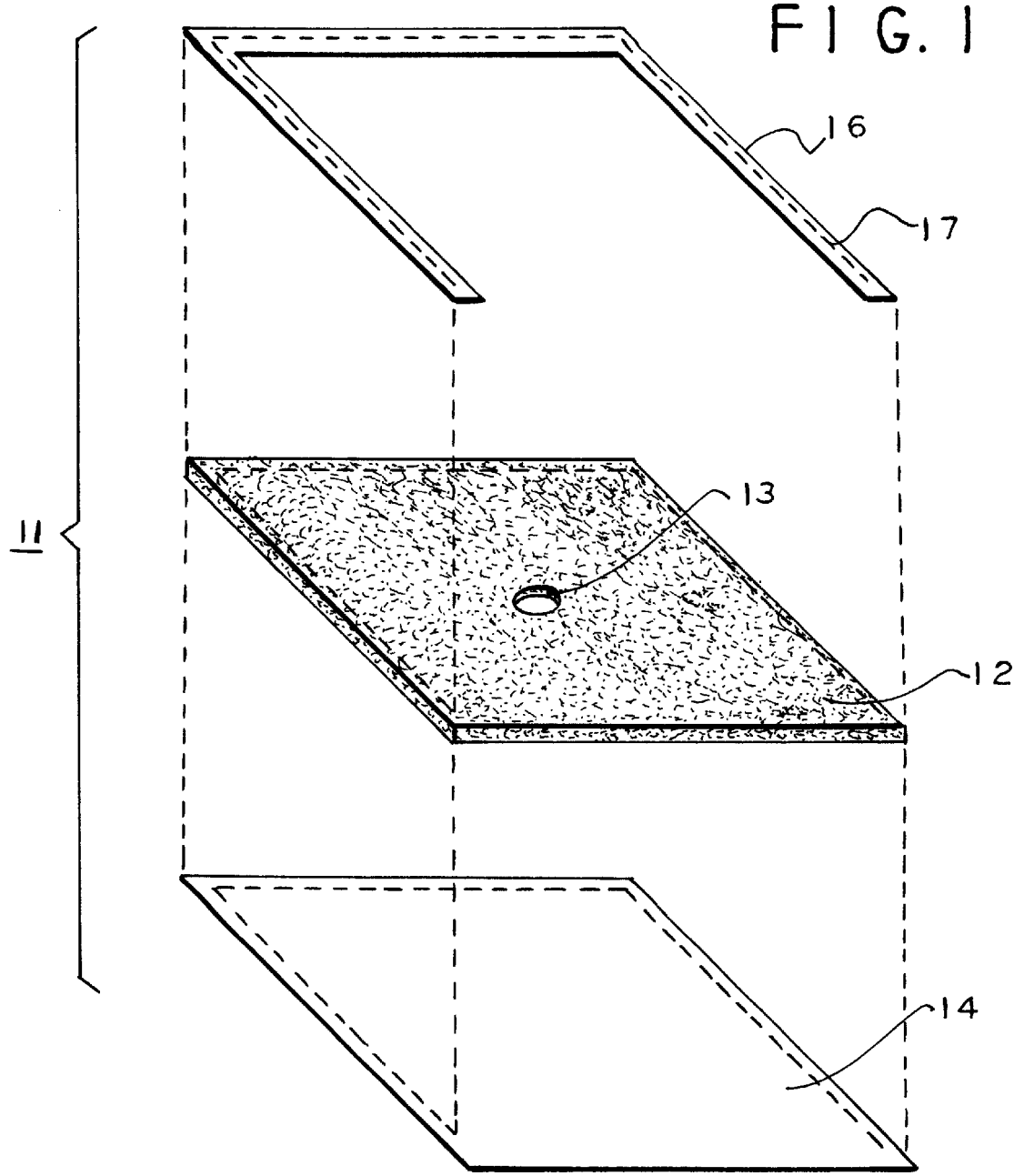
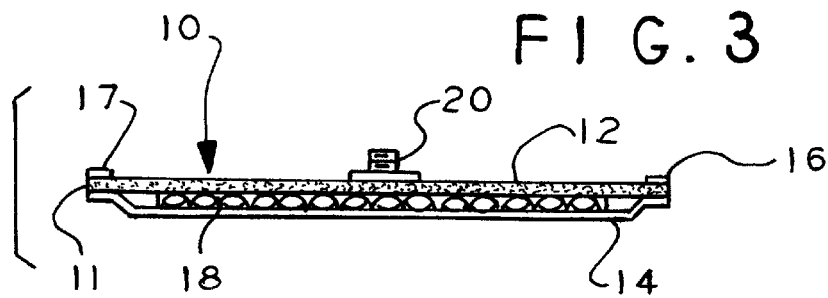

FILTERS INCLUDING FILTER ENVELOPES FORMED FROM PANELS HAVING DIFFERENT PERMEABILITIES

This is a Continuation of application Ser. No. 09/028,223 filed Feb. 23, 1998.

This invention relates to filters for filtering undesirable materials or impurities from liquids, such as used cooking oils, for example. More particularly, this invention relates to filters which include a filter envelope, wherein the filter envelope is formed from filter panels formed from materials having different thicknesses, structural strengths, and/or permeabilities, whereby flow of the liquid to be filtered is directed through the panel having the greater permeability.

The term "permeability," as used herein, means the ability of a material to permit the flow of a liquid therethrough. Thus, materials which have a low resistance to the flow of liquids therethrough have greater permeabilities, and materials which have a high resistance to the flow of liquids therethrough have lesser permeabilities.

In a typical frying operation, large quantities of edible cooking oils or fats are heated in pans or vats to temperatures of from about 315° F. to about 400° F. or more, and the food is immersed in the oil or fat for cooking. During repeated use of the cooking oil or fat, the high cooking temperatures, in combination with water from the food being fried, cause the formation of free fatty acids (or FFA). An increase in the FFA decreases the oil's smoke point and results in increasing smoke as the oil ages. In addition, the cooking oil may include solid impurities, such as, for example, small pieces of the food being cooked.

In addition to hydrolysis, which forms free fatty acids, there occurs oxidative degeneration of fats which results from contact of air with hot oil, thereby producing oxidized fatty acids (or OFA). Heating transforms the oxidized fatty acids into secondary and tertiary by-products which may cause off-flavors and off-odors in the oil and fried food.

Caramelization also occurs during the use of oil over a period of time, resulting in a very dark color of the oil, which, combined with other by-products, produces dark and unappealing fried foods.

Such solid and dissolved impurities in general are removed from such used cooking oils by passing such oils through a filter. Such a filter includes one or more of the following components including, but not limited to, screens, metal spacer grids, filter papers, filter pads, or combinations thereof. In connection with the filter, the oil may be contacted with a variety of materials or filter aids, adsorbents, or neutralizing agents, generally in the form of powders or particles, to remove free fatty acids, oxidized fatty acids and other by-products from the oil. Such materials include, but are not limited to, magnesium silicate, diatomite, calcium silicate, and alkali materials such as alkaline earth metal hydroxides, alkaline earth metal oxides, alkali metal carbonates, alkali metal bicarbonates, alkaline earth metal carbonates, and alkali metal silicates. Such materials may be placed upon the filter or contained within the filter. For example, when a filter pad or filter paper is employed, such materials may be impregnated in the filter pad or filter paper.

One example of a filter includes a metal spacer grid which is contained within a filter paper envelope. The paper envelope may be impregnated with a filter aid, such as those hereinabove described. Such a filter in general is disposed at the bottom of a pan of used cooking oil. The metal spacer grid has a fitting which extends from the grid through a panel or side of the filter envelope. The fitting may be connected to a pipe which is connected to a pump. When the pump is activated, the oil flows through the paper envelope on both sides of the filter, through the interstices of the metal spacer grid, and through the metal fitting and pipe. The filtered oil then may be recycled for further cooking.

When a filter paper envelope is employed, however, in general, a limited quantity of filter aid may be impregnated in the filter paper. Thus, the treated oil may retain an unacceptable amount of undesirable materials such as free fatty acids and oxidized fatty acids, as well as other by-products. Furthermore, it is well known that "depth filtration" is the most effective means of removing particulate materials without "blinding" or plugging the filter. Depth filtration is achieved by forming a thick filter cake on a filter septum such as a filter paper or screen or by the use of a filter pad made of fibrous material such as cellulose. The filter cake or pad creates a tortuous path of increasingly smaller capillaries with a sizable surface area which trap fine particles. Although a filter pad can be impregnated with a sufficient quantity of filter aid, such pads in general are less stable structurally than filter papers for use as an envelope and, therefore, have not been used to form filter envelopes surrounding spacer grids. Filter paper, however, has sufficient structural strength to be fused easily around its peripheral edges to form a filter envelope.

It is an object of the present invention to provide a filter for filtering undesired materials from a fluid, such as cooking oil, for example, which can be impregnated with a desired amount of filter aid yet remain stable structurally. Such object is accomplished when a filter is formed from first and second filter panels having different permeabilities, such as, for example, wherein the first panel is a filter pad and the second panel is formed from at least one filter paper. The filter paper, which has a greater structural strength than the filter pad, gives support to the filter pad when the peripheral edges are fused.

Furthermore, in order to obtain the full effect of the ingredient(s) impregnated into the filter pad, it is necessary to direct the liquid flow through the filter pad and not through the filter paper. This is accomplished by employing a filter paper that has a lower permeability than the filter pad.

In accordance with an aspect of the present invention, there is provided a filter for removing undesired materials from a fluid. The filter comprises a filter envelope including a first panel and a second panel. The first panel has a first permeability, and the second panel has a second permeability. The first permeability is greater than the second permeability. Each of the first and second panels includes a peripheral region, wherein a portion but not all of the peripheral regions are fused to each other. The non-fused portions of the peripheral regions of the first panel and the second panel provide a first opening in the envelope. In one embodiment, one of the first panel and the second panel has a second opening for receiving a conduit means for conducting a liquid from the filter.

In general, the permeabilities of the first and second panels may be determined from the amount of vacuum drawn through the first and second panels from an inlet side to an outlet side. The vacuum drawn through the panel is related inversely to the permeability. Thus, the first panel has a lower amount of vacuum drawn therethrough than the amount of vacuum drawn through second panel.

In one embodiment, the permeabilities of the materials which form the first and second panels are measured in accordance with a filter medium permeability test, the procedures for which are given hereinbelow. In this test, a filter apparatus is employed. The filter apparatus includes an outer cylindrical container which contains a circular and planar screen upon which is placed the filter medium to be tested. The container is attached to a conduit which is connected to a positive displacement pump. The apparatus also includes a vacuum gauge for measuring the vacuum drawn through the filter. In general, in each test of a filter medium, a disc of the filter medium is placed on top of the screen. In general, the diameter of the disc is greater than the diameter of the screen. An inner cylinder having an inside diameter which is less than that of the disc of the filter medium then is placed on top of the filter medium. Thus, the filter medium is prepared for the permeability testing.

For each filter medium tested, a sample of 150 g of corn oil is placed in a 250 ml beaker. A Whatman 41 filter paper is placed upon the screen in the outer cylindrical container. The inner cylinder then is placed inside the outer cylinder and upon the filter paper. The apparatus is flushed for 5 minutes with at least 150 g of hot oil at 150° C. The Whatman 41 filter paper is removed and replaced with a sample of the filter medium, such as, for example, a filter pad or filter paper. A sample of 150 g of oil is heated to 150° C.±2° C. The oil then is poured into the inner cylinder and contacts the filter medium. The positive displacement pump then is activated such that the oil is circulated and recycled through the filter medium. The oil is circulated at a flow rate or positive displacement, of 52 ml/min. per square inch of surface area of the filter medium. After the oil has been circulated for five minutes, and the amount of vacuum being drawn in inches of mercury is measured.

The oil then is redirected to a collection beaker. The first panel, which has a greater permeability than the second panel, will have a lower amount of vacuum drawn therethrough than the second panel. In general, when the first panel is a filter pad and the second panel is a filter paper, the filter pad has a vacuum drawn therethrough, according to the procedure hereinabove described, of from about 1.0 in. to about 12.0 in., preferably from about 2.5 in. to about 8.0 in. of mercury at a displacement of 52 m/min. per square inch of surface area of filter pad, and the filter paper has a vacuum drawn therethrough of from about 5.0 in. to about 30.0 in., preferably from about 19.0 in. to about 28.0 in. of mercury at a displacement of 52 ml/min. per square inch of surface area of filter paper, provided that the amount of vacuum drawn through the filter pad is less than that drawn through the filter paper.

In another aspect, the first and second panels of the filter envelope may be fused to each other by a variety of means, such as by stitching or by an adhesive. In a further aspect, when the first panel is a filter pad and the second panel is a filter paper, a small strip of the same material and permeability as the filter paper may be placed upon the peripheral region of the filter pad. The strip, filter pad, and filter paper then are stitched to each other to form the filter envelope.

The filter envelope may be of any shape, including square, rectangular, trapezoidal, and circular. The shape of the filter envelope may be in conformity with the shape of the pan or vat of used cooking oil into which the filter envelope is placed.

In a further aspect, the opening for receiving a conduit means is in the first panel. In another embodiment, the opening for receiving a conduit means is in the second panel.

In a preferred aspect, the filter further comprises a spacer grid contained within the filter envelope. In general, the spacer grid is the same shape as that of the filter envelope, and is inserted into the filter envelope through the opening formed by the non-fused portions of the peripheral regions of the first and second panels of the filter envelope.

In general, the spacer grid may be a metal grid formed from a material including, but not limited to, perforated metal, expanded metal, or wire cloth containing a plurality of openings or interstices through which liquid may pass. In one embodiment, the grid is expanded metal formed by a multiplicity of intersecting undulating metal strips which form a plurality of interstices through which the fluid may pass. An example of a metal grid which may be employed is sold by Semrow Perforated and Expanded Metal Corporation, of Des Plaines, Ill. In another preferred embodiment, the filter further comprises a conduit fitting extending from the spacer grid through the opening for receiving a conduit means in one of the first panel or the second panel. In one embodiment, the conduit fitting means is a threaded nipple attached, such as by welds, for example, to the spacer grid.

In another embodiment, the filter further comprises a clip means, which is fitted over the opening provided by the non-fused portions of the peripheral regions of the first panel and the second panel. In one embodiment, the clip may include an opening for receiving a conduit means or a conduit fitting means, whereby liquid is conducted from the filter by passage through the clip. In such an embodiment, neither the first panel nor the second panel includes an opening for receiving a conduit means.

In a most preferred embodiment, the filter envelope includes a first panel, which is a filter pad, and a second panel, which is a filter paper. The filter pad and filter paper may be formed from materials such as those herein described. An opening for receiving a conduit means is provided in the filter pad. The filter pad has a permeability which is greater than that of the filter paper. The filter pad is impregnated with a filter aid as herein described.

In a further aspect, the filter envelope has a square or rectangular shape, and a strip of filter paper is placed on top of the filter pad at three sides of the filter pad. The strip, filter pad, and filter paper are stitched together at the three sides. The fourth side is not stitched together, but is left open, forming an envelope with a transverse opening between the pad and paper. A spacer grid then is inserted through the opening into the filter envelope. The spacer grid may be formed from intersecting and undulating metal strips that are attached to each other by spot welds. A conduit fitting is welded to the spacer grid and projects through the opening in the filter pad. Once the spacer grid is inserted into the filter envelope, a metal clip is fitted over the opening formed by the non-fused sides of the filter pad and the filter paper. Thus, the filter now is sealed on all sides.

BRIEF DESCRIPTION OF THE DRAWINGS

The invention now will be described with respect to the drawings wherein:

FIG. 1 is an exploded view of an embodiment of a filter envelope of the present invention;

FIG. 3 is a cross-sectional view of an embodiment of an assembled filter.

Figure 2:
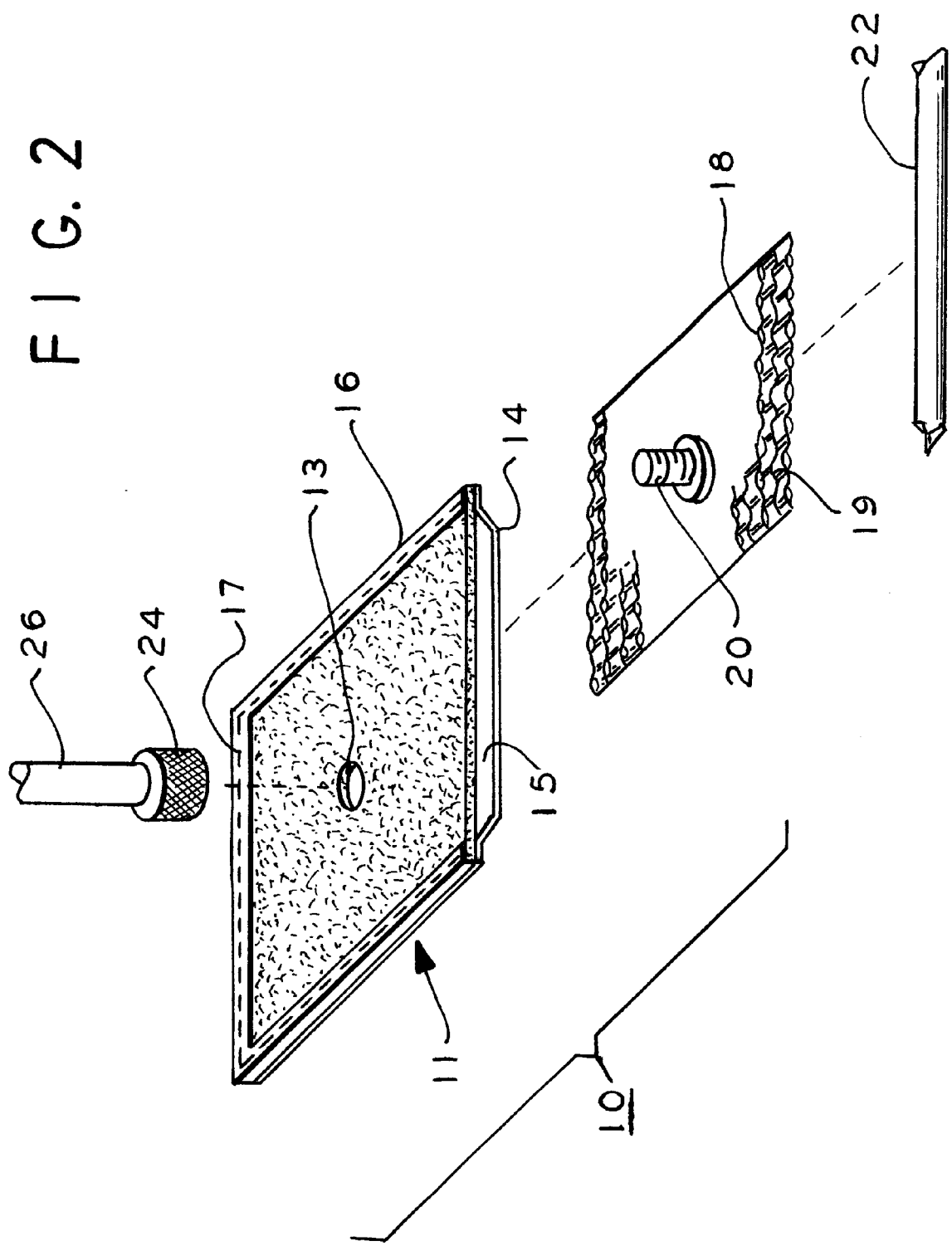
FIG. 2 is an exploded view of an embodiment of a filter of the present invention wherein a filter envelope encloses a filter grid.

Referring now to the drawings, a filter 10 (FIG. 3) includes a filter envelope 11 (FIG. 1) which includes a preferably rectangular filter panel preferably comprising a pad 12 having a central opening 13 and a panel preferably comprising a rectangular filter paper 14. Filter pad 12 and filter paper 14 may have the same lengths and widths, or filter paper 14 may be slightly longer on the open peripheral edge so as to provide for an overlapping flap for sealing the opening with clip 22 (FIG. 2). The filter pad 12 and filter paper 14 may be formed from materials including cellulosic fiber and resin binder. Cellulosic fibers which may be employed include those obtained from wood pulp. Examples of such wood pulp fibers which may be employed include those sold under the trade name "Regular Kraft" by Weyerhaueuser Company of Federal Way, Washington, and those sold under the trade name "Tyee Kraft," also by Weyerhaueuser Company. Resin binders which may be employed include melamine-formaldehyde resins, urea-formaldehyde resins, or any number of "food grade" commercially available resins.

The filter pad 12 may be made from a water slurry which includes cellulosic fiber resin binder, and a filter aid as hereinabove described. The slurry is mixed thoroughly, and then is subjected to a shearing action in a refiner.

The refined slurry is poured onto a screen for dewatering, thereby forming a filter pad. The uniformity of thickness of the pad may be achieved with moving rakes which distribute the refined slurry over the surface of the screen. After dewatering, the pad is dried in an oven. After drying, the pad is cut into the desired shape, and an opening is cut in the pad to accommodate the passage of a conduit means therethrough. The trimmings which result form the cutting of the filter pad may be used as part of the feedstock of solids in a subsequent filter.

The filter pad 12, has a permeability greater than that of the filter paper 14. The permeability may be varied by varying the amount of cellulose in the slurry, and/or by varying the degree of refining. The paper panel 14 provides enhanced structural stability to the filter envelope 11. In general, the filter paper 14 has a permeability which is less than that of filter pad 12. An elongated narrow paper strip 16 is placed upon the peripheral region of filter pad 12 such that paper strip 16 covers three of the four edges of the peripheral region. Stitches 17 affix paper strip 16 to filter pad 12, and affix filter pad 12 to filter paper 14. The non-stitched sides of filter pad 12 and filter paper 14 form a transverse opening 15 (FIG. 2) in the filter envelope 11. Into opening 15 is inserted a filter grid 18 (FIG. 2) formed from a plurality of intersecting and undulating metal strips 19 which provide a plurality of interstices. Attached to filter grid 18 is a threaded conduit fitting or nipple 20. Filter grid 18 is inserted into opening 15 such that nipple 20 projects upwardly through opening 13 of filter pad 12. An elongated clip 22 then is fitted over opening 15 for the length of the opening 15, whereby clip 22 presses the non-stitched ends of filter pad 12 and filter pad 14 against each other to provide a complete seal of the peripheral regions of the filter. Clip 22 may be a U-shaped elongated metal sheet member.

The filter 10 then may be placed at or near the bottom of a pan or vat (not shown) of used cooking oil. A pipe fitting 24 (FIG. 2) connected to a suction pipe 26, is screwed onto nipple 20 to secure the suction pipe 26 to the filter 10. A vacuum pump (not shown) connected to suction pipe 26 then is activated. Filter pad 12 has a greater permeability than filter paper 14. As a result, the flow of oil will follow the path of least resistance, and thus will be directed away, from filter paper 14 and toward and through filter pad 12. As the oil passes through filter pad 12, solid components, such as crumbs and other materials, may be collected upon the top of filter pad 12, and impurities such as free fatty acids and oxidized fatty acids may be removed by the filter aids, such as those described below, which may be contained in filter pad 12.

The oil then contacts the filter grid 18 and passes among the intersecting and undulating metal strips 19 of filter grid 18 to nipple 20. The oil then passes upwardly through nipple 20 and fitting 24 to suction pipe 26. Suction pipe 26 transports the treated oil from the pan or vat such that the oil can be collected and/or transported for reuse.

The filter pad preferably is impregnated with a purifying material for purifying the liquid, such as a filter aid, an adsorbent, or a neutralizing agent, preferably in the form of a powder, for removing undesirable materials from fluid. When the fluid is used cooking oil, such impurities include free fatty acids or oxidized fatty acids, and the filter aids may be selected from those described herein.

In a further embodiment, the first panel further contains magnesium silicate.

In general, the magnesium silicate may be a magnesium silicate which is acceptable as a filter aid in food processing applications. For example, the Food Chemical Codex, Third Edition, gives the following specifications for a synthetic magnesium silicate which is acceptable in food processing and industrial frying operations:

| Loss or Drying | 15% max |
| Loss on Ignition | 15% max (dry basis) |
| % MgO | 15% min. (ignited basis) |
| % $SiO_2$ | 67% min. (ignited basis) |
| Soluble salts | 3% max. |
| Mole ratio MgO:$SiO_2$ | 1:1.36 to 1:3.82 |

In a further embodiment, the magnesium silicate is an amorphous synthetic magnesium silicate having a surface area of at least 300 square meters per gram, and preferably has a surface area from about 400 square meters per gram to about 700 square meters per gram, and more preferably has a surface area from about 400 square meters per gram to about 600 square meters per gram. In addition, such magnesium silicate is preferably employed as coarse particles, with at least 75%, and preferably at least 85% of the particles having a particle size which is greater than 400 mesh, and with no more than 15%, and preferably no more than 5%, all by weight, having a particle size greater than 40 mesh. In most cases, the average particle size of the magnesium silicate employed is in the order of but not limited to 20–75 microns. It is to be understood, however, that the magnesium silicate may have a particle size different than the preferred size. For example, the magnesium silicate may be used as a finely divided powder, i.e., 50% or more passes through a 325 mesh screen.

In addition, the hydrated magnesium silicate which is employed in accordance with a preferred embodiment of the present invention generally has a bulk density in the order of from 15–35 lbs./cu.ft., a pH of 7–10.8 (5% water suspension) and a mole ratio of MgO to $SiO_2$ of 1:1.8 to 1:4.

The following is a specification and typical value for a magnesium silicate which is employed in accordance with a preferred embodiment of the present invention:

TABLE

| Parameter | Specification | Typical Value |
|---|---|---|
| Loss on Drying at 105° C. | 15% max. | 12% |
| Loss on Ignition at 900° C. | 15% max | 12% |
| Mole Ratio MgO:$SiO_2$ | 1:2.25 to 1:2.75 | 1:2.60 |
| pH of 5% Water Suspension | 8.5 ± 0.5 | 8.5 |
| Soluble Salts % by wt. | 3.0 max. | 1.0% |

TABLE-continued

| Parameter | Specification | Typical Value |
|---|---|---|
| Sieve Analysis: | | |
| % on 40 mesh | 5% max. | 1% |
| thru 400 mesh | 15% max. | 10% |
| Surface Area (B.E.T.) | 300 M²/g min. | 400 |
| Refractive Index | | Approx. 1.5 |

A representative example of such a synthetic magnesium silicate having a surface area of at least 300 square meters per gram is available as Magnesol® Polysorb 30/40, a product of the Dallas Group of America, Inc., Liberty Corner, N.J., and also is described in U.S. Pat. No. 4,681,768.

In another embodiment, the magnesium silicate is an amorphous, hydrous, precipitated synthetic magnesium silicate which has been treated to reduce the pH thereof to less than about 9.0. As used herein, the term "precipitated" means that the amorphous hydrated precipitated synthetic magnesium silicate is produced as a result of precipitation formed upon the contact of a magnesium salt and a source of silicate in an aqueous medium.

For purposes of the present invention, the pH of the magnesium silicate is the pH of the magnesium silicate as measured in a 5% slurry of the magnesium silicate in water. The pH of the treated magnesium silicate in a 5% slurry preferably is from about 8.2 to about 8.9, and more preferably from about 8.5 to about 8.8, and most preferably is about 8.5. An example of such a treated amorphous hydrous precipitated synthetic magnesium silicate is available as Magnesol® XL, a product of the Dallas Group of America, Inc., Liberty Corner, N.J., and also is described in U.S. Pat. No. 5,006,356.

In yet another embodiment, the magnesium silicate is a magnesium silicate which has a surface area of from about 50 square meters per gram to about 150 square meters per gram. Preferably, such a magnesium silicate has a mole ratio of MgO to $SiO_2$ of from about 2:2.6 to about 1:3.4, and a pH (5% water suspension) of from about 9.5 to about 10.5. An example of such a magnesium silicate is available as Magnesol® HMR-LS, a product of the Dallas Group of America, Inc., Liberty Corner, N.J.

In another embodiment, the magnesium silicate may be in the form of talc.

It is to be understood, however, that the scope of the present invention is not to be limited to any specific type of magnesium silicate or method for the production thereof.

In a further embodiment, in addition to the magnesium silicate, the filter aid which is contained in the first panel further includes at least one alkali material selected from the group consisting of alkaline earth metal hydroxides; alkaline earth metal oxides; alkali metal carbonates; alkali metal bicarbonates; alkaline earth metal carbonates; and alkali metal silicates.

In a further embodiment, the at least one alkali material is an alkaline earth metal hydroxide.

Preferably, the alkaline earth metal hydroxide is calcium hydroxide $(Ca(OH)_2)$.

In another embodiment, the at least one alkali material is an alkaline earth metal oxide. Alkaline earth metal hydroxides which may be employed include, but are not limited to, magnesium oxide (MgO) and calcium oxide (CaO).

In another embodiment, the at least one alkali material is an alkali metal carbonate. Alkali metal carbonates which may be employed include, but are not limited to, sodium carbonate $(Na_2CO_3)$.

In another embodiment, the at least one alkali material is an alkali metal bicarbonate. Alkali metal bicarbonates which may be employed include, but are not limited to, sodium bicorbonate $(NaHCO_2)$, and potassium bicarbonate $(KHCO_3)$.

In another embodiment, the at least one alkali material is an alkaline earth metal carbonate. Alkaline earth metal carbonates which may be employed include, but are not limited to, calcium carbonate $(CaCO_3)$.

In another embodiment, the at least one alkali material is an alkali metal silicate. Alkali metal silicates which may be employed include, but are not limited to, sodium metasilicate $(Na_2SiO_3)$.

In another embodiment, the at least one alkali material is present in an amount of from about 3 wt. % to about 35 wt. %, preferably from about 5 wt. % to about 10 wt. %, with the remainder being magnesium silicate, based on the two components.

Examples of combinations of magnesium silicate and at least one alkali material are described further in U.S. Pat. No. 5,597,600 the contents of which are incorporated herein by reference.

The disclosures of all patents and publications referenced in this specification are specifically incorporated by reference in their entirety to the same extent as if each such individual patent and publication were specifically and individually indicated to be incorporated by reference.

It is to be understood, however, that the scope of the present invention is not to be limited to the specific embodiment described above. The invention may be practiced other than as particularly described and still be within the scope of the accompanying claims.

What is claimed is:

1. In a filter for removing materials from a fluid, the combination comprising:

(i) a filter envelope consisting essentially of a first panel having a first peripheral region and a second panel having a second peripheral region, said first panel being a filter pad having a first permeability and a second panel being a filter paper having a second permeability, wherein said first permeability is greater than said second permeability wherein a portion but not all of the first and second peripheral regions are fused to each other, leaving non-fused portions of the first and second peripheral regions, and the non-fused portions of the first and second peripheral regions provides an opening into said envelope, and wherein one of said filter pad and said filter paper includes an opening for receiving a conduit means for conducting a liquid from said filter; and (ii) a spacer grid contained within said filter envelope, said spacer grid including a first surface in contact with said filter pad and a second surface in contact with said filter paper.

2. The combination of claim 1 further comprising a conduit fitting means extending from said spacer grid through said opening for receiving said conduit means in one of said first panel or said second panel in fluid communication with the region between said first and second panels.

3. The combination of claim 1 and further comprising a clip means, said clip means being fitted over said opening into said envelope formed by said non-fused portions of the peripheral regions of said first panel and said second panel, thereby sealing said opening.

4. The combination of claim 1 wherein said first panel further contains a purifying material selected from the group consisting of filter aids, adsorbents, and neutralizing agents.

5. The combination of claim 4 wherein said purifying material is magnesium silicate.

6. The combination of claim 5 wherein said magnesium silicate is an amorphous synthetic magnesium silicate having a surface area of at least 300 square meters per gram.

7. The combination of claim 6 wherein said magnesium silicate has a surface area from about 400 square meters per gram to about 700 square meters per gram.

8. The combination of claim 7 wherein said magnesium silicate has a surface area of from about 400 square meters per gram to about 600 square meters per gram.

9. The combination of claim 5 wherein said magnesium silicate is an amorphous, hydrous, precipitated synthetic magnesium silicate which has been treated to reduce the pH thereof to less than about 9.0.

10. The combination of claim 5 wherein said magnesium silicate is a magnesium silicate which has a surface area of from about 50 square meters per gram to about 150 square meters per gram.

* * * * *